United States Patent [19]

Higginbotham et al.

[11] Patent Number: 5,183,340
[45] Date of Patent: Feb. 2, 1993

[54] BEARING AND BEARING ASSEMBLY

[75] Inventors: Jeff A. Higginbotham, Highlands; George Garcia, Texas City; Robert L. Richards, Dickenson, all of Tex.

[73] Assignee: Amoco Corporation, Chicago, Ill.

[21] Appl. No.: 898,931

[22] Filed: Jun. 12, 1992

Related U.S. Application Data

[63] Continuation of Ser. No. 833,336, Feb. 10, 1992, abandoned, which is a continuation of Ser. No. 548,718, Sep. 19, 1990, abandoned.

[51] Int. Cl.⁵ .................... F16C 17/04; F16C 33/20
[52] U.S. Cl. .................................. 384/420; 384/297
[58] Field of Search ............ 384/121, 123–125, 384/223–225, 302–304, 368–371, 420, 424–427, 248, 249, 251, 901, 908, 909

[56] References Cited

U.S. PATENT DOCUMENTS

| | | | |
|---|---|---|---|
| 2,168,345 | 8/1939 | Kingsbury | 384/368 |
| 2,872,256 | 2/1959 | Thomson | 384/420 |
| 3,048,456 | 8/1962 | Gruber | 384/303 |
| 4,362,343 | 12/1982 | Visser | 384/123 X |
| 4,854,745 | 8/1989 | Kamimura et al. | 384/124 X |

FOREIGN PATENT DOCUMENTS

| | | | |
|---|---|---|---|
| 1162328 | 9/1958 | France | 384/424 |
| 499419 | 1/1976 | U.S.S.R. | 384/121 |

Primary Examiner—Thomas R. Hannon
Attorney, Agent, or Firm—Matthew R. Hooper; Stephen L. Hensley; Frank J. Sroka

[57] ABSTRACT

A bearing comprising a first side in alignment with a radial axis and a second side opposite said first side; said first side including a bumper for withstanding thrust, extending outwardly therefrom; and an inner-axial surface in alignment with an axial axis and an outer-axial surface opposite the inner-axial surface.

16 Claims, 5 Drawing Sheets

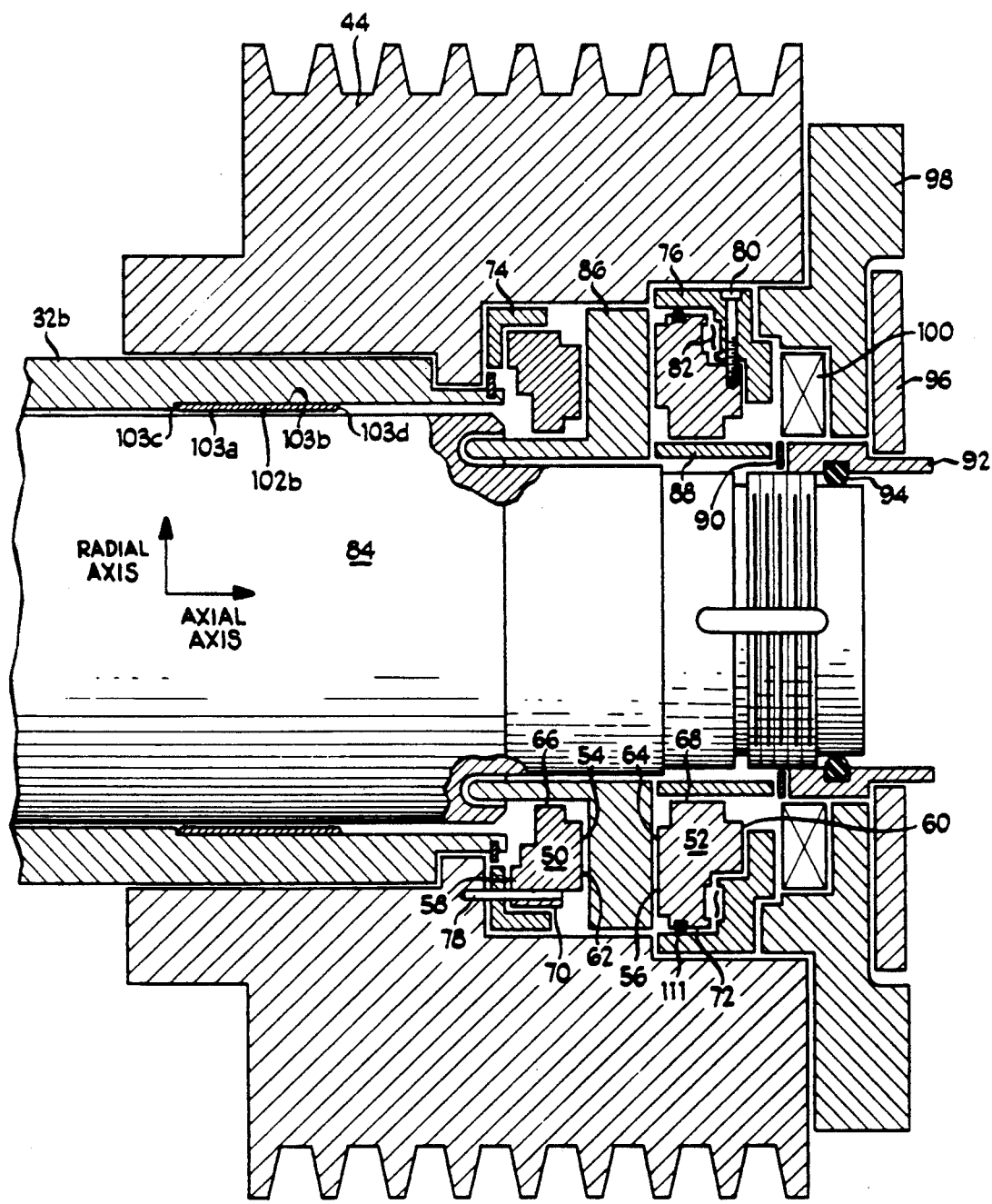

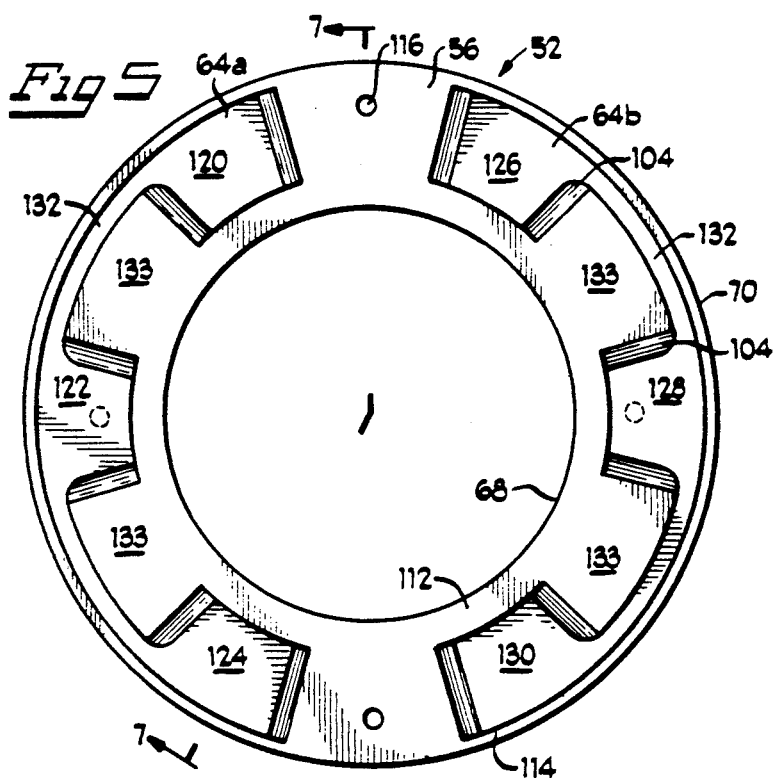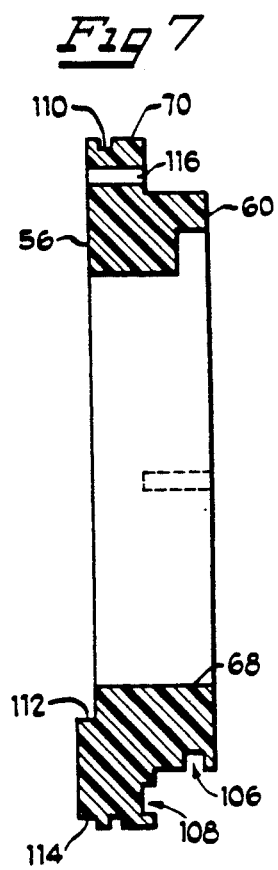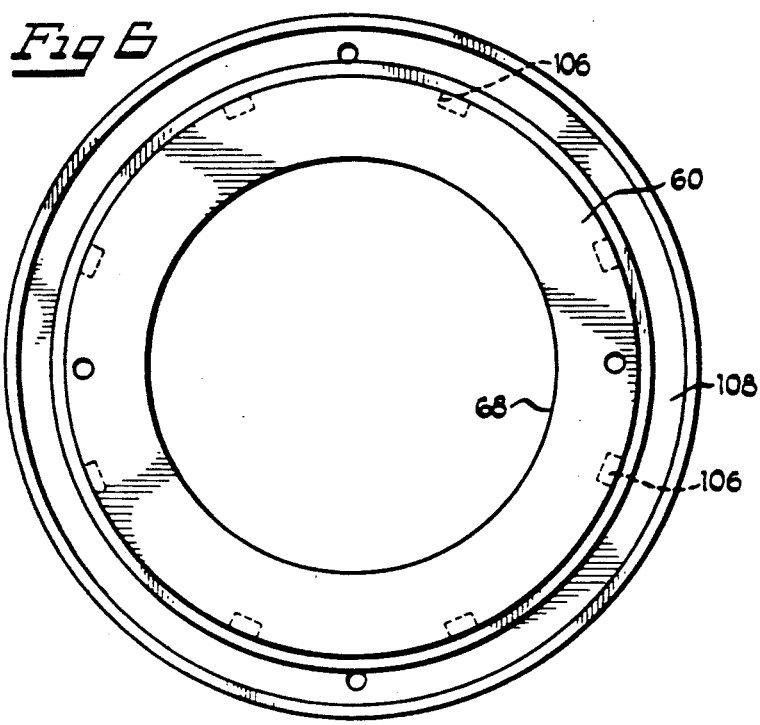

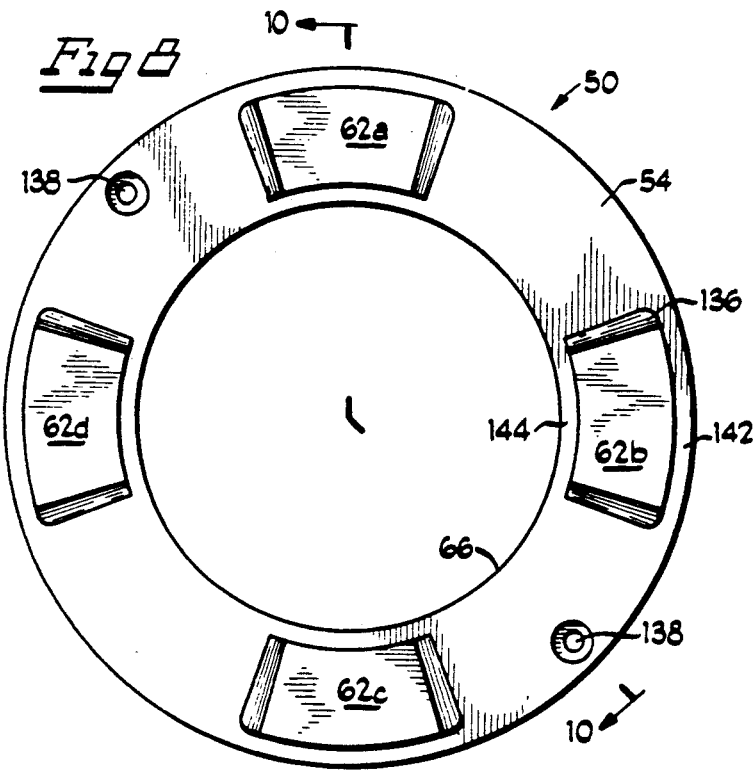
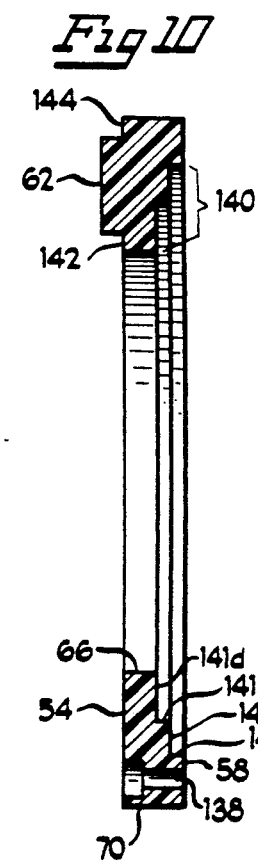
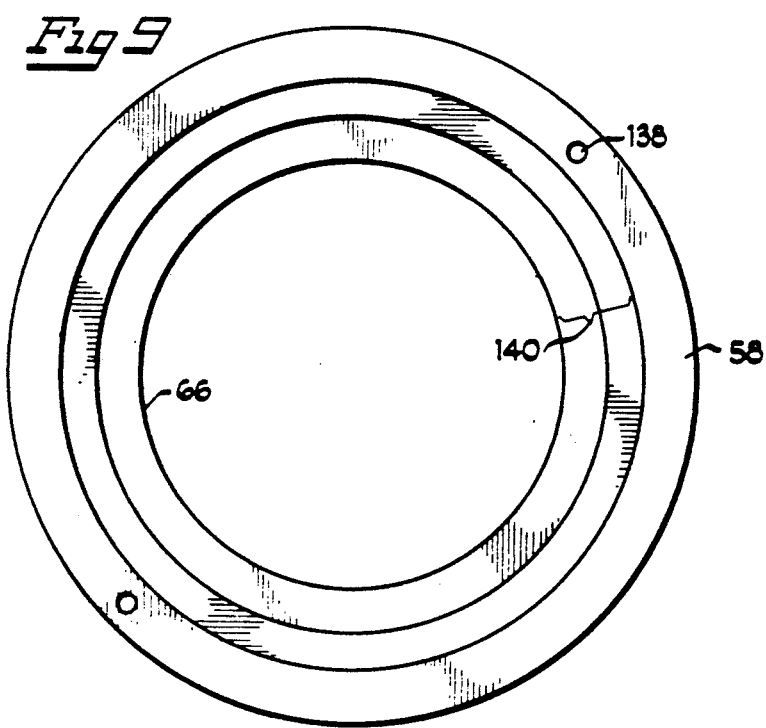

BEARING AND BEARING ASSEMBLY

This is a continuation of application Ser. No. 07,833,336, filed Feb. 10, 1992 abandoned which in return is a continuation of Ser. No. 07/584,718 filed Sep. 19, 1990 abandoned.

FIELD OF THE INVENTION

This invention relates to a bearing comprising a first side in alignment with a radial axis and a second side opposite said first side; said first side including bumper means for withstanding thrust, extending outwardly therefrom; and an inner-axial surface in alignment with an axial axis and an outer-axial surface opposite said inner-axial surface.

BACKGROUND OF THE INVENTION

In various types of rotating machinery, it has historically been a problem to provide bearings and bushings which do not fail. A bearing is defined as a machine part in which another part turns or slies. A bearing is subjected to compressional forces, pressures, or thrusts, and must be capable of withstanding a specified weight when a structure such as a shaft, rests upon such bearing. The generally accepted definition of thrust, is the rearward force exerted endwise or in an axial direction through a propeller shaft, to give forward motion.

Referring to FIG. 1, a conventional double thrust bearing is illustrated. This conventional double thrust bearing includes two {2} rows of ball bearings enclosed in a housing. These bearings have been met with high failure rates because of excessive thrust loads and inadequate lubrication. Moreover, these thrust bearings require shutdown every two weeks for lubrication. Experience has shown that the failure rates of machines having such thrust bearings were extremely high, approximately 66 percent per year, causing extensive maintenance costs and loss of production.

Referring to FIG. 2, in an attempt to solve the above problems, a second generation thrust bearing was developed by Assignee. The tapered thrust bearing of FIG. 2, includes an inner and outer race a and b both made of steel, with rollers c therebetween. Such design also includes a brass shim d and a spacer sleeve e also made of steel. This design reduced the failure rate to about 25% per year.

It is therefore an object of this invention to provide a bearing which is self-aligning and provides minimal friction between itself and a rotating surface.

It is also an object of this invention to provide a bearing and bearing assembly which is efficient not only in terms of capabilities, but also in terms of drastic reduction in down time of expensive machinery used in complex processes.

We have now found that the objects of this invention can be achieved by providing an improved bearing and bearing assembly, which can substantially withstand severe compressional or thrust forces.

Despite the significant advances offered by Assignee's second generation of tapered thrust bearings, there remains a need for improved thrust bearings and assemblies having an improved life expectancy, low failure rate, can be easily fabricated, and requires less frequent lubrication.

SUMMARY OF THE INVENTION

The bearing of the instant invention is a bearing comprising a bearing comprising a first side in alignment with a radial axis and a second side opposite said first side; said first side including bumper means for withstanding thrust, extending outwardly therefrom; and an inner-axial surface in alignment with an axial axis and an outer-axial surface opposite said inner-axial surface.

The instant invention also provides a bearing assembly comprising thrust bearings comprising an inboard bearing and an outboard bearing each comprising a first-active side in alignment with a radial axis and a second-inactive side opposite said first side, said first side including bumper means for withstanding thrust, extending outwardly therefrom, and an inner-axial surface in alignment with an axial axis and an outer-axial surface opposite said inner-axial surface; and means for aligning said thrust bearings in proximity to a rotating device.

BRIEF DESCRIPTION OF THE DRAWINGS

FIG. 4 is an enlarged partial cross-sectional view of the screen bowl centrifugal with a bearing and bearing assembly in accordance with principals of the present invention.

FIG. 5 is an enlarged front view of the bearing of FIG. 4 in accordance with principals of the present invention.

FIG. 6 is an enlarged rear view of the bearing of FIG. 4 in accordance with principals of the present invention.

FIG. 7 is an enlarged cross-sectional view of the bearing of FIG. 4 taken substantially along line 7—7 of FIG. 5 in accordance with principals of the present invention.

FIG. 8 is an enlarged front view of a portion of the bearing assembly of FIG. 4 in accordance with principals of the present invention.

FIG. 9 is an enlarged rear view of a portion of the bearing assembly of FIG. 4 in accordance with principals of the present invention.

FIG. 10 is an enlarged cross-sectional view of a portion of the bearing assembly of FIG. 4 taken substantially along line 10—10 of FIG. 8 in accordance with principals of the present invention.

DESCRIPTION OF THE PREFERRED EMBODIMENT

While this invention is susceptible of embodiments in many forms, there are shown in FIGs. 3-10, one embodiment suitable for use in the practice of this invention, with the understanding that the present disclosures not intended to limit the invention to the embodiment illustrated.

Figure 3:
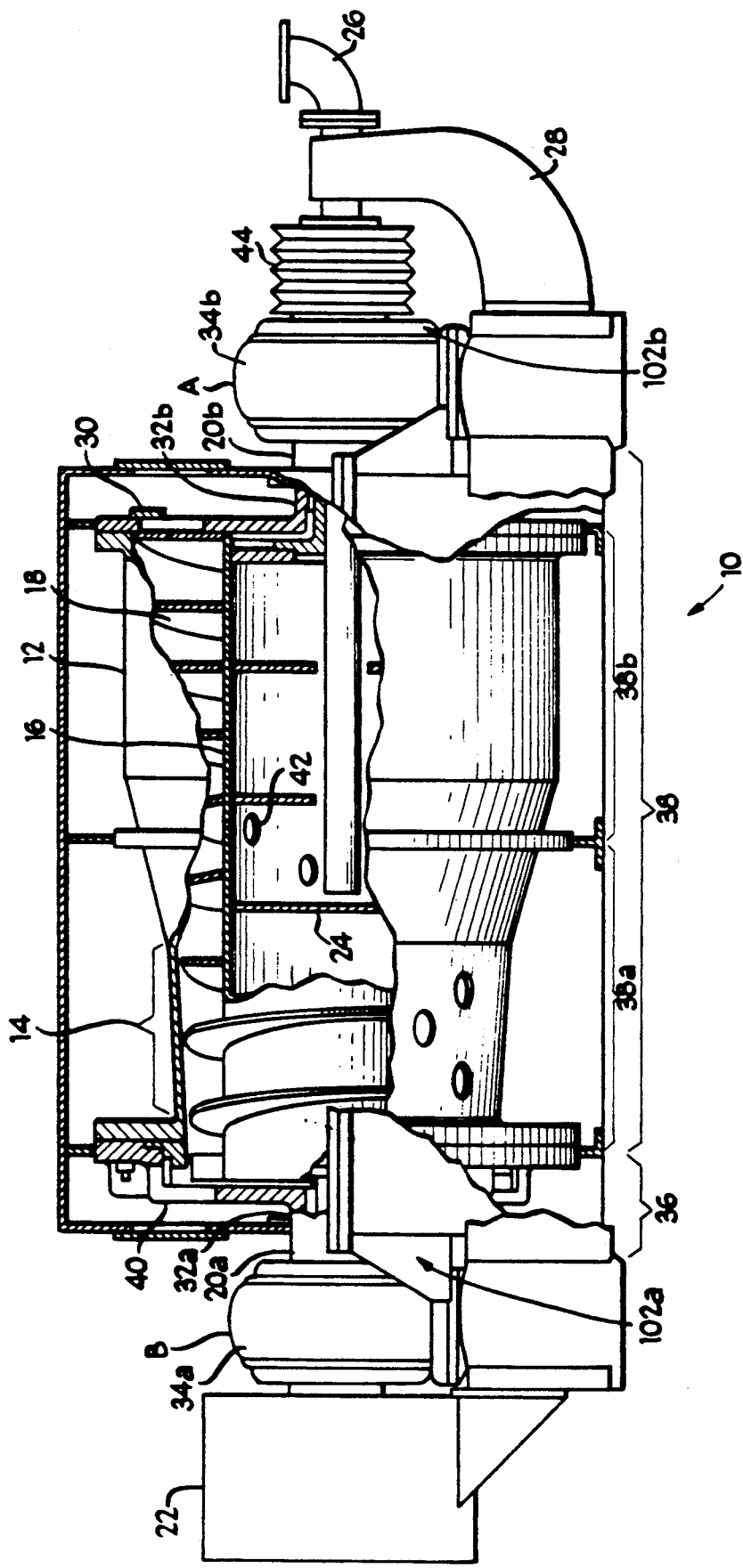
FIG. 3 is a cross-sectional view partially cut away of a screen bowl centrifugal.

Illustrated in FIG. 3, is a conventional screen bowl centrifugal 10. This centrifugal 10 is primarily used to separate solids from liquids. The two principal machine elements of the centrifuge 10, are the bowl 12 with screen area 14 and conveyer 16 with outwardly extending helical conveyer flights 18. The bowl 12 consists of a cylindrical section and two truncated cones of different cone angle. The conveyer 16 has the same contour as the bowl 12 and the clearance between the conveyer flights 18 and the inner wall of bowl 12 is held to a practical minimum.

The conveyer 16 is supported by two bushings located in the bowl trunnions 20a and 20b, and is rotated at a speed different from that of the bowl 12. The difference in speed between the bowl 12 and conveyer 16 is accomplished by a gear reduction means in gear box 22. In the middle portion of the conveyer 16, is a baffle plate 24 which acts as a feed distributor.

At the influent end of centrifugal 10, is a feed inlet for passing feed slurry through feed pipe 26. The slurry is directed and splashed outwardly by the rotating conveyer 16 baffle plate 24, and subsequently travels through feed port 42. The stationary feed pipe 26 is supported by a bracket 28 and projects partially through and inside of the conveyer 16, to direct feed slurry therein. Extending axially outwardly from the bowl 12 are bowl trunnion shafts 20a and 20b. The trunnion shafts 20a and 20b are supported primarily by ball or roller bearings and thus carry the entire rotating assembly in bearing housings 34a and 34b. At the effluent end of the bowl, are openings, with adjustable weirs 30 for discharging liquid. These weirs 30 are positioned such that a portion of the bowl 12 in the solids discharge area is not submerged, thus providing a drainage deck on which the solids, as they are conveyed across it, may also be washed before final drainage. The bowl 12 near the effluent end of centrifugal 10, has a large port for discharging the dewatered solids. Suitable partitions in the centrifuge 10 form compartments for receiving discharged solids and effluent through the solid and effluent discharge chutes 36 and 38, at the lower portion of the centrifuge 10. The effluent discharge chute 38 includes a screen section 38a and liquid section 38b.

Referring to FIG. 3, at the influent end of centrifuge 10, is a driven sheave 44 which is attached to a belt and motor, for circulating and driving the bowl 12 and conveyer 16. Typically, the bowl 12 is driven at a faster speed than the conveyer 16. This is accomplished by the gear reduction means of gear box 22.

In operation, slurry is delivered preferably at a constant feed volume through the centrifuge feed pipe 26 to insure proper operation and good performance, and to prevent exceeding machine capacity in terms of either solids or liquids throughput. The feed pipe 26 directs the slurry to the selected compartment by the baffle plate 24 from which it is distributed through the feed ports 42 into the bowl 12. Centrifugal force holds the slurry against the bowl 12 inner wall, substantially in the form of a hollow cylinder. As slurry is fed into the bowl 12, the inner diameter of the cylinder decreases, or in other words, the level of the slurry in the bowl 12 will rise until it reaches the circle of adjustable weirs 30 at the influent side of centrifuge 10. At this point liquid will begin to overflow out of these weirs into the discharge chute 38, causing the level of slurry in the bowl 12 to, of course, stop rising. The overflow from the adjustable weirs 30 continues just as long as feed is coming in. Centrifugal force meanwhile acts on the solids suspended in the slurry and causes them to settle out onto the inner wall of the bowl 12. As the solids become sufficiently compacted, they are transported by the conveyer flights or helixes 18 in the direction of the solid discharge weirs 40. At least some liquid drains due to centrifugal force through the screen area 14, through discharge chute 38 back into the slurry pool.

Illustrated in FIG. 4, is an enlarged view of the bearing and bearing assembly of the instant invention. The bearing assembly includes two thrust bearings comprising an inboard bearing or inactive bearing 50, and an outboard bearing or active bearing 52, each comprising a first active side 54 and 56 in alignment with a radial axis and a second-inactive side 58 and 60 opposite the first sides 54 and 56 respectively, the first sides 54 and 56 including bumper means 62 and 64 for withstanding thrusts, extending outwardly therefrom, and an inner-axial surface 66 and 68 in alignment with an axial axis and an outer-axial surface 70 and 72 opposite said inner-axial surfaces 66 and 68, respectively; and means for aligning the thrust bearings in proximity to a rotating device.

The bumper means 62 and 64 provide a heavy cross-section of material to absorb shock during unwanted vibration and excursions and high thrusts. They have been specially configured and designed to be able to withstand axial and radial excursions or vibrations with minimal or no damage. The component sections making up the bumper means 62 and 64 are strategically located to substantially withstand the aforementioned excursions and/or thrusts caused by, for example, worn out bearings in the bearing housing 34a and 34b, and compressional forces or thrusts caused by pushing the cake on the inside wall of bowl 12. In addition, the outboard bearing 52 permits radial and axial floating, thereby allowing the bearing to be self-adjusting, by carefully following any changes or excursions of the rotating device, shaft 84 or collar means 86.

Referring to FIG. 4, the alignment means include: a) alignment means 74 for aligning inboard bearing 50; and b) alignment means 76 for aligning outboard bearing 52, with respect to a rotating device. The inboard alignment means 74 is annular and the cross-sectional view is L-shaped in FIG. 4, to receive the inboard bearing 50. A securing means 78 such as but not limited to pins, tubular objects, screws, and the like for securing inboard bearing 50 to alignment means 74 can be utilized. In a preferred embodiment, two alignment means 74 are adequate for securely attaching the inboard bearing 50 to the alignment means 74 and driven sheave 44.

Referring to FIG. 4, a floating means or securing means 80 for allowing the outboard bearing 52 to float at least partially within the outboard alignment means 76, minimizes the possibility of chipping, cracking or damage to the outboard bearing 52 by allowing the outboard bearing 52 to follow the rotating device closely. The floating or securing means 80 can include, but is not limited to, screws, pins, elongated objects and the like. Preferably, the floating means 80 diameter is small enough to allow the outboard bearing 52 at least some freedom of movement in the axial and radial directions.

Referring to FIG. 4, biasing means 82 for biasing the outboard bearing 52 in the inboard direction is included to minimize the possibility of cracking, chipping, vibration and the like when an undue thrust is applied thereto. The biasing means 82 can include, for example, a conventional wavey washer, a spring means, and the like. The biasing means 82 is located and sandwiched between the outboard bearing 52 and alignment means 76. During normal operation, the biasing means 82 collapses to allow the outboard bearing 52 to touch and abut the outboard alignment means 82 to allow thrust to be substantially evenly distributed about the outboard bearing 52. When unloaded or when centrifugal 10 is shut down, the biasing means 82 allows the outboard bearing 52 to float and follow collar means 86 so that such collar means 86 will not slam and possibly crack or damage outboard bearing 52 upon a subsequent start up of centrifugal 10.

A rotating device which rotates at a speed different from the inboard and outboard bearings 50 and 52, includes a circulating shaft 84 and an annular-L shaped collar means 86 for transferring thrust to the inboard and outboard bearings 50 and 52, spacer 88, lock washer 90 and lock nut 92 with O-ring 94 adapted to fit between shaft 84 and lock nut 92, and thrust monitor plate 96 all rotate at a speed different from the speed at which the inboard and outboard bearings 50 and 52, rotate.

The collar means 86 has very fine surfaces facing the inboard and outboard bearings 50 and 52 to minimize the generation of friction and/or heat therebetween. The collar means 86 can be made of any material that can withstand the conditions it will be subjected to, preferable a heat treated steel for minimal generation of heat at the surfaces touching the inboard and outboard bearings 50 and 52. The spacer 88 is made of a heat treated steel and is utilized to adjust the distance from the collar means 86 to the lock nut 92 to provide proper thread engagement of nut 92 to shaft 84.

Referring to FIG. 4, a bearing cap 98, grease seal 100 and steady bearing bushings 102a (FIG. 3) and 102b rotate at substantially the same speed as the bowl 12 and inboard and outboard bearings 50 and 52. The grease seal 100 substantially minimizes leakage of lubricant in the outboard direction.

The steady bearing bushing 102b is positioned in proximity to the inboard bearing 50, in a direction inboard of the inboard bearing 50 and alignment means 74. Both bushings 102a and 102b surround a portion of the rotating device shaft 84, and are sandwiched between shaft 84 and bowl trunnion shafts 32a and 32b, respectively. Referring to FIGS. 3 and 4, since the shaft 84 has feed pipe 26 therethrough at the influent end, the shaft 84 is hollow and therefore tends to deform, bend, vibrate, wobble, oscillate and deflect during operation. The steady bearing bushing 102b minimizes such unwanted deflections, vibrations, etc. in proximity to the thrust bearings 50 and 52. Similarly, the steady bearing bushing 102a substantially minimizes vibration on the effluent side of screen bowl centrifugal 10, thereby enhancing the life of the gear box 22. The bushings 102a and 102b have smooth surfaces on the inner and outer axial surfaces 103a and 103b to minimize friction and beveled or inclined radial surfaces 103c and 103d for simplified assembly.

The thrust bearings 50 and 52 and steady bearing bushings 102a and 102b are made of a material sufficient to withstand the thrusts, upsets, vibrations, etc. normally seen in a rotating environment, yet generate minimal friction so as to minimize undesirable heat generation. In a preferred embodiment, bearings 50 and 52 and bushings 102a and 102b are made of a poly(amideimide).

Referring to FIG. 5, the bumper means 64 of the outboard bearing 52, comprises a first and second bumper means 64a and 64b. The bumper means 64 comprise a substantially smooth and substantially annular surface. The first bumper means 64a of FIG. 5 resembles the letter "E" and the second bumper means 64b resembles the number "3" three. The bumper means 64 include inclined portions 104 between selected portions of the substantially smooth-annular surface and the first side 56, for enhancing the spread of lubrication and substantially minimizing the possibility of bumper means 64 cracking or chipping by providing a gradualinclined surface for meeting and contacting collar means 86. The inclined portions 104 can vary greatly, preferably ranging from about 45° or less from first side 56, and most preferably about 10° or less, for a smooth transition from first side 56 to bumper means 64.

Referring to FIG. 5, the first bumper means 64a includes a first, second, and third section 120, 122, and 124. Similarly, the second bumper means 64b includes a first, second, and third section 126, 128, and 130. Each of the above sections include a shoulder area 132 and reservoir area 133 therebetween. The shoulder and reservoir areas 132 and 133 provides an area to dissipate heat from bumper means 64. The sections 120, 122, 124, 126, 128, and 130 have been substantially equally distributed about first side 56 to carry heavy thrusts equally, and yet to provide cooling and lubricating of bumper means 64 and the other components of the bearing assembly.

Referring to FIG. 6, on the second side 60 of the outboard bearing 52 are located several insets 106 adapted for receiving the floating means 80. As previously stated, the diameter of insets 106 is larger than the diameter of the floating means 80 for allowing the outboard bearing 52 to float at least partially within the outboard bearing alignment means 76, to minimize shock, such as cracking or chipping upon intense thrust or unwanted vibration by allowing such bearing 52 to closely follow the axial and radial movement of collar means 86. Referring to FIG. 7, the second side 60 has been designed to receive an equal load on both shoulders 60a and 60b to withstand thrust loads equally across such side 60 and for alignment with respect to alignment means 76 and cap 98. Although not shown in the drawings, alignment pins attaching cap 98 to alignment means 76 are included for proper lubrication alignment for ports 116. Referring to FIG. 7, an annular channel 108 on second side 60 is configured to receive the biasing means 82, snugly therein. An annular channel 110 adapted to receive an O-ring 111 on the outer-axial surface 72 is provided to minimize chatter and/or vibration of the outboard bearing 52 with respect to the collar means 86. The O-ring also helps to center bearing 52 in place with respect to alignment means 76 and collar means 86.

Referring to FIGS. 5 and 7, an inner and outer portions 112 and 114 of first side 56 have been provided with slot sections or groove areas to substantially minimize cracking or chipping of bumper means 64 in proximity thereto. Preferably, the bumper means 64 does not extend to the inner axial surface 66 and outer-axial surface 72, because the inner and outer portions 112 and 114 are most vulnerable to damage by chipping or cracking during severe vibration, thrusts or excursions. Moreover, inner and outer portions 112 and 114 provide larger clearances from other components, thereby minimizing the possibility of damage to portions 112 and 114 and bumper means 64. The outboard bearing 52 also includes ports 116 to facilitate the lubrication of the bearing assembly.

Referring to FIG. 8, the inboard bearing 50 first side 54 includes inclined portions 136 to enhance the circulation of lubricants in and around such area. Moreover, the inclined portions 136 provide a gradual incline for the bumper means 62, thereby minimizing the possibility of chipping and cracking upon contact with rotating devices which are rotating at different speeds from this bearing 50. The bumper means 62 includes a first, second, third and fourth section 62a, 62b, 62c, and 62d, respectively. The inboard bearing 50 has been designed with void areas between sections 62a, 62b, 62c, and 62d to enhance the cooling and dissipation of heat of said sections 62a, 62b, 62c and 62d, due to the friction generated by the bumper means 62 and collar means 86 rotating at different speeds. Any number of sections can be utilized. In a preferred embodiment, bumper means 62 includes four sections to substantially equalize the loading or thrust to bearing 50. Sections 62a, 62b, 62c, and 62d are substantially flat to minimize the generation of unwanted heat. Referring to FIG. 8, openings 138 provide ports adapted to receive securing means 78 therethrough, thereby allowing the inboard bearing 50 to be attached to the alignment means 74 and driven sheave 44, as shown in FIG. 4. Referring to FIG. 10, a step area 140, comprising surfaces 141a, 141b, 141c, and 141d, provides a large clearance to minimize the possibility of contacting such surfaces with the bowl trunnion shaft 32b and shaft 84 in FIG. 4. Similarly, inner and outer portions 142 and 144 of the first side 54 of the inboard bearing 50 are grooved to minimize cracking and chipping in proximity thereto, since such sections tend to crack or chip easier than the middle sections therebetween.

The inboard and outboard bearing 50 and 52 and steady bearing bushings 102a and 102b can be made of any material which is capable of withstanding the environments to which they will be exposed during use and which is sufficiently resilient to minimize the possibility of damage, such as cracking or chipping. Preferably a thermoplastic material which has sufficient mechanical strength and chemical and thermal resistance is used. Examples include aromatic polymers such as polyamides, polyesters and polycarbonates, as well as polyaryl ethers, sulfones, ketones and the like. Most preferably, an amide-imide polymeric material is employed, due to its desirable combination of advantageous characteristics, such as performance from about −320° F. to about +500° F.; outstanding mechanical strength; easy fabrication, e.g., by injection or compression molding or compaction sintering; low flammability; fatigue strength; impact strength; creep resistance; wear resistance; low coefficients of expansion; and excellent thermal stability. Alloying elements such as other thermoplastic materials including polyarylates, polyesters, poly(ether ether ketones), poly(aryl ether ketones), poly(aryl sulfones), poly(aryl ethers), other polyimides and polyamides, and the like, can be included with the polyamides-imides if desired.

The poly(amide-imide) polymers (PAI) are known engineering polymers and can be prepared by reacting components comprising an aromatic tricarboxylic acid compound, such as trimellitic acid (TMA) or 4-trimellitoyl anhydride halide (4-TMAC) and a diamine component comprising at least one wholly or partially aromatic primary diamine. The amide-imide polymers are preferably prepared by reacting an acyl halide derivative of an aromatic tricarboxylic acid anhydride with a largely or wholly-aromatic primary diamine or mixture thereof. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecules units of:

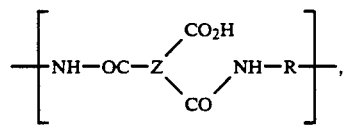

wherein the free carboxyl groups are ortho to one amide group, Z is an aromatic moiety containing 1 to 4 benzene rings or lower-alkyl-substituted benzene rings, R comprises one or more wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—.

The polyamides are capable of substantially complete imidization by heating by which they form the polyamide-imide structure having to a substantial extent recurring units of:

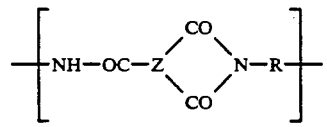

wherein one carbonyl group is meta to and one carbonyl group is para to each amide group and wherein Z and R are defined as above. Typically the polyamides-imides have up to about 50 percent imidization prior to heat treatment, typically about 10 to about 40 percent.

The polyamide-imide copolymers are prepared from an anhydride-containing substance and a diamine component comprising wholly or partially aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower alkyl-substituted benzene ring, and most preferably, the substance is the acyl chloride derivative of trimellitic acid anhydride (4-TMAC).

When a mixture of diamines is used, such mixture can contain two or more, preferably two or three, wholly- or largely-aromatic primary diamines.

The wholly- or largely-aromatic primary diamines used in preparation of these polyamides-imides comprise an aromatic moiety containing 6 to about 10 carbon atoms or two or more divalent aromatic moieties of from 6 to about 10 carbon atoms, each moiety containing one primary amine group, and the moieties linked directly or through, for example, a bridging —O—, —S—, —SO$_2$—, —CO—, or methylene group. Preferred diamines include oxybisaniline and metaphenelene diamine. When three diamines are used they are preferably selected from the class composed of:

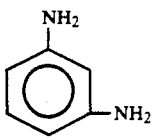

and

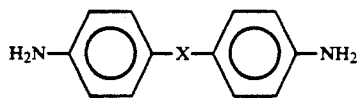

said X being an —O—, —CH$_2$—, or —SO$_2$— group. More preferably, the mixture of aromatic primary diamines is two-component and is composed of meta-phenylene-diamine (MPDA) and p,p'-oxybis(aniline) (OBA), p,p'-methylenebis(aniline) (MBA), and p,p'-oxybis(aniline), p,p'-sulfonylbis(aniline) (SOBA), and p,p'-oxybis(aniline), p,p'-sulfonylbis(aniline) and metaphenylene-diamine, or p,p'-sulfonylbis (aniline) and p,p'-methylenebis(aniline). Most preferably, the mixture of primary aromatic diamines contains meta-phenylenediamine and p,p'-oxybis(aniline). The aromatic nature of the diamines contributes to the excellent thermal properties of the copolymers while the primary amine groups permit the desired imide rings and amide linkages to be formed.

When two diamines are used to achieve a polymer usefully combining properties of both diamines, it is usual to stay within the range of about 10 mole % of the first diamine and 90 mole % of the second diamine to about 90 mole % of the first diamine and 10 mole % of the second diamine. Preferably, the range is about a 20 to 80 mole percent to about an 80 to 20 mole percent. In the preferred embodiment wherein the acyl chloride of trimellitic acid anhydride is copolymerized with a mixture of p,p'-oxybis(aniline) and metaphenylenediamine, the preferred range is from about 30 mole % of the former and about 70 mole % of the latter to about 70 mole % of the former and about 30 mole % of the latter.

As previously stated, a preferred bearing 50 or 52 and/or bushing 102a and 102b, comprises a poly(amide-imide) composition, which can be injection or compression molded, or compaction sintered.

Injection molding techniques are known to persons of skill in the plastics fabrication art and are commonly referred to as reciprocating screw injection molding. The general principles of reciprocating screw injection molding are set forth below, it being understood that the description is intended for purposes of illustration.

In reciprocating screw injection molding, powdered or pelletized polymer is delivered to a hopper and from there fed into the feed end of a barrel, typically cylindrical, which houses a screw adapted for rotation and reciprocal motion within the barrel along the length thereof. The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure," is applied to the end of the screw at the feed end of the barrel. An opposing pressure develops due to accumulation of polymer at the nozzle end of the barrel, and when this pressure exceeds the back pressure, the screw is pushed away from the nozzle.

When the accumulating polymer fills the chamber or the portion of the barrel vacated by the screw, or in some instances, when the screw reaches a pre-determined position, pressure, commonly referred to as "injection pressure," is applied to the screw, and the accumulated polymer is forced through the nozzle into a mold which is commonly heated. In some cases, a booster is used to aid in the injection. Typically, a non-return check valve is employed to prevent polymer from flowing back toward the screw. Following injection of the polymer into the mold, the polymer is held therein, the mold is cooled, and the molded part removed.

The exact conditions under which the polymers described herein are injection molded will vary depending upon the polymer to be molded, the polymer spiral flow, the injection molding equipment employed, and the molded article to be prepared. Typical operating conditions include barrel-set temperatures of from 600° F. to 700° F., injection pressures ranging from 10,000 psi to 30,000 psi and cycle times of between 75 seconds to 180 seconds, depending on the polymer used. Molding cycles also vary depending upon choice of polymer, molding equipment and the like.

Compression molding techniques also are suitable and are well known in the art. See, for example, Amoco Torlon ® Engineering Resins Bulletin, Code Number TAT-2, issued October 1974. In this bulletin, Guidelines for Compression Molding of Torlon powders is disclosed. A standard hydraulic press, with adjustable closing speed, is utilized. A chrome plated, polished, hardened tool steel mold is used to minimize sticking of the polymer to the mold. Prior to molding, and later at regular intervals as required for proper part ejection, a light coat of a high temperature mold release can be applied. The resin is preconditioned by preheating the polymer, for example, to about 530° F. in a hot air oven. Insufficient preheating can result in a defective part caused by trapped moisture or a longer required cycle time. Preheating at too high a temperature causes lumps in the powder. The next step is the molding step, which comprises: 1} Filling a predetermined amount of preheated polymer into a mold preheated to a temperature above the glass transition temperature of the polymer, for example, about 620°-650° F. for certain polyamides-imides. 2} Compressing the polymer using a pressure sufficient to compact the polymer and forcing the polymer to conform to the polymer cavity, for example at approximately 4,000 psi. Minimum pressure requirements will vary somewhat depending on part geometry. 3} Maintaining the applied pressure until all of the polymer is molten and the melt flows throughout the mold. 4} Cooling the mold to below glass transition temperature of the polymer, e.g., about 500° F. And, 5} ejecting the molded part as soon as it has cooled sufficiently. Thereafter, the compression molded ingot can be machined to the desired shape.

The superior chemical resistance and mechanical properties of compression molded polyamide-imides are particularly well-suited for replacement of metal parts in rotating machinery. The lubricity and memory inherent in this polymer is highly desirable for use in the inventive bearings and bushings. High efficiency designs can be achieved with this polymer that are difficult to achieve with current metal parts. For example, the inventive bearings and bushings can be mass produced at a modest cost by plunge cutting and gluing pieces together with amide-imide adhesive instead of intricate, multistep machining required for making metal seals. In highly oxidizing environments or services containing amines and/or caustics, other resins may be acceptable owing to their tolerance to such environments. Service temperatures can range from about −320° F. to 500° F.

Although specific embodiments of this invention have been shown and described, it is to be understood that various modifications and substitutions, as well as rearrangements and combinations of the preceding embodiments, can be made by those skilled in the art without departing from the novel spirit and scope of this invention.

COMPARATIVE EXAMPLES

Control A

Figure 1:
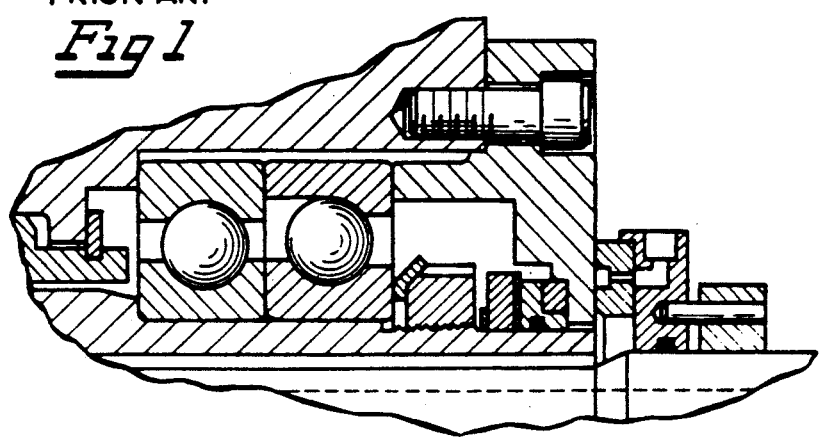

A conventional double thrust bearing corresponding to that illustrated in FIG. 1, was run in an 40×60 Screen Bowl Centrifugal manufactured by Bird Machine Company. The centrifuge was monitored so as to be substantially within the factory designated tolerances, clearances, and running conditions. All the related components were properly lubricated. A vibration measuring device was strategically placed at locations A and B on the bearing housings 34b and 34a, respectively of FIG. 3, to measure the horizontal, vertical and axial vibration. The resulting data are measured in inches per second. The results are given in Table 1. The first vibration measurements were taken under an unloaded condition, and the following two were taken under a loaded condition.

Examples

A twenty pound blend of 80% by weight poly(amide-imide), Torlon ® 4000 TF available from Amoco Performance Products, Inc., 12% by weight 9033 Graphite and 8% by weight Tetra fluoroethylene, Teflon ®, was placed in a tray and the tray with the blend was placed in a hot air oven for 18 hours.

The hot air oven temperature included the following: 2 hrs. @ 200° F.; 2 hrs. @ 250° F.; 2 hrs. @ 285° F.; 2 hrs. @ 325° F.; 1 hr. @ 400° F.; and 9 hrs. @ 485° F. A mold was preheated to 350° F. for the last 2 hours {i.e. at the 16th hour} of the above blend drying cycle. The mold at 350° F. was charged with the blend at 485° F. The charged mold was placed in a preheated oven at 500° F. The blend temperature was raised to 512° F. and maintained there for 45 minutes. The mold was then removed from the oven and wrapped with a blanket of insulation to minimize heat loss. The mold was next placed in a press and bumped sufficiently to remove the air and gas in the blended material. Bumping as used herein, includes squeezing the mold intermittently by activating and deactivating the hydraulic press which squeezes the mold, to substantially remove the air and gas from the blended material in the mold. The mold was pressurized to 10,000 psi and maintained under this pressure for 45 minutes. The pressure was slowly released over 12 minutes and the mold was placed into a preheated oven at 510° F. The blend temperature was then raised to 650° F. for 10 minutes. The mold was removed from the oven and wrapped with an insulation blanket to minimize heat loss. The mold was next placed in the press and the ram was rapidly closed. The blend was pressurized to 10,000 psi and held for 6 hours. While still pressurized in the press, the mold was air cooled to 400° F. The pressure was released after 6 hours, and the mold was removed from the press and wrapped to allow the blend to slowly cool over 12 hours as described above. The mold was then reheated to 275° F. wherein an ingot formed from the blend was ejected. The ingot was tubular or donut shaped having a hollow inside. After cooling, the ingot was machined directly into the outboard bearing 52 of FIGS. 5, 6, and 7 and inboard bearing 50 of FIGS. 8, 9, and 10.

Example I

A bearing and bearing assembly corresponding to that illustrated in FIG. 4, was tested in the same 40×60 screen bowl centrifugal of Control A. Example 1 also included the poly(amideimide) steady bearing bushings designated as items 102a and 102b described herein. The centrifuge was carefully maintained and monitored so as to be within the factory designated tolerances and clearances. The centrifuge exhibited a smooth acceleration up to running speed with no visible evidence of abnormal or unwanted vibration below running speed. All related components were properly lubricated. The driven sheave 44, bowl trunnion shaft 32, alignment means 74 and 76, inboard and outboard bearings 50 and 52, bearing cap 98, and grease seal 100, were rotated at 1575 rpms. The shaft 84, collar means 86, spacer 88, lockwasher 90, locknut 92 and thrust monitor plate 96 were rotated at 1556 rpms in the same direction as the above components.

The vibration measurements of Example I are given in Table I. The first measurement was taken under an unloaded condition, and the subsequent two measurements were taken under a loaded condition. After approximately 27 days, the bearings were taken out of service and measured for wear. The bumper means corresponding to item 62 measured 0.0025 inches of wear.

Example II

The same design of bearings and bearing assembly of Example I was tested in a different 40×60 Screen Bowl Centrifugal from that of Control A and Example I. This test was performed in substantially the same way as that of Example I. This example did not include the bearing bushings designated as 102a and 102b. The results are given in Table 2. The first vibration measurements T1 were taken under an unloaded condition, and the following measurements were taken under a loaded condition. The initial test lasted 29 days. Thereafter, the centrifuge was shut down and the inboard and outboard bearings 50 and 52 were inspected. The inboard bearing bumper means was measured, and 0.002 inches of wear was detected. The bearing assembly was then reassembled and the machine was placed back in service. Approximately, 2½ months after the initial date of the test or T1, the machine was shut down and the inboard bearing 50 was again inspected, and there was no further appreciable wear detected. After (7) seven and (11) eleven months from such initial test date T1, the inboard bearing 50 was again measured for wear. The inboard bearing bumper means wear measured 0.003 inches.

Control B

Figure 2:
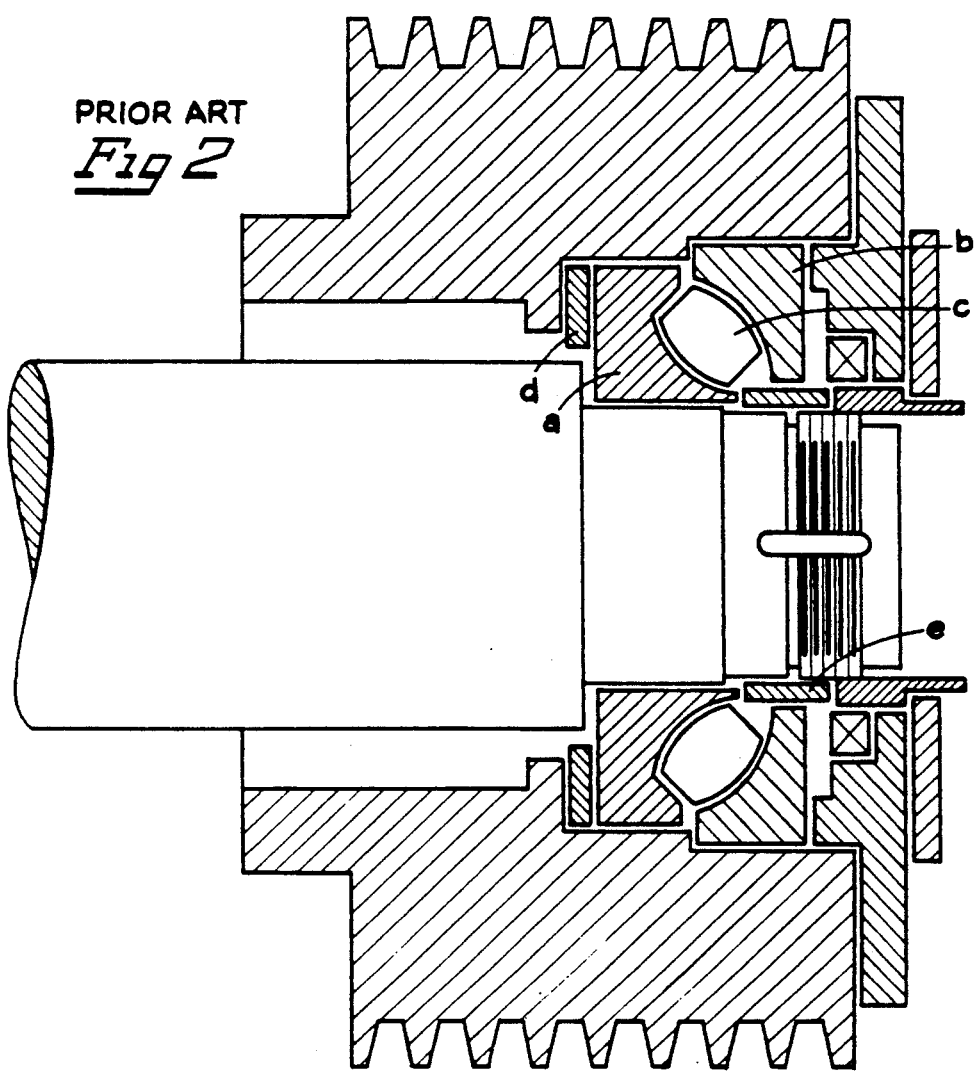
FIGS. 1 and 2 are cross-sectional views of prior art bearings.

The tapered thrust bearings corresponding to that illustrated in FIG. 2, was run in a 40×60 Screen Bowl Centrifugal different from those of Examples I and II. The centrifuge has properly lubricated, and was run substantially within factory designated tolerances and clearances. The results are given in Table 3. The first vibration measurements T1, were taken under an unloaded condition, and subsequent measurements were under loaded conditions.

Example III

The centrifuge of Control B was modified to include the inventive bearing and bearing assembly of FIG. 4, with poly(amideimide) steady bearing bushings designated as 102a and 102b herein. The results are given in Table 4. The first measurements, T1 were taken under an unloaded condition, and the subsequent measurements were taken under loaded conditions. After approximately 40 days, the bearings were inspected and the bumper means 62 measured 0.0025 inches of wear.

The centrifuges with the bearings 50 and 52 of Examples I, II, and III have not failed to date, and were observed as vibrating less than the centrifuges in Controls A and B. The unloaded vibration measurements in Examples I, II and III appeared lower than the unloaded vibration measurements of Controls A and B. The loaded vibration measurements of Examples I, II, and III were generally at least equal to or lower than that of Controls A and B. It is submitted, that lower vibration readings in rotating equipment, enhance the useful life of the wearing or moving parts by reducing the wear of such parts, thereby resulting in maintenance savings and decreasing costly down time due to failures.

TABLE III

| | | T1 VEL. IN/SEC | T2 9 days VEL. IN/SEC | T3 21 days VEL. IN/SEC | T4 29 days VEL. IN/SEC | T5 68 days VEL. IN/SEC |
|---|---|---|---|---|---|---|
| | | | Control B | | | |
| A | H | .60 | .50/.60 | .28 | .35/.75 | .20/.26 |
|   | V | .30 | .16/.28 | .21/.26 | .30/.60 | .20/.26 |
|   | A | .18 | .20/.30 | .10 | .13/.20 | .18/.24 |
| B | H | .10 | .22/.30 | .28 | .20/.36 | .18/.28 |
|   | V | .10/.14 | .15/.25 | .24/.28 | .15/.40 | .20/.30 |
|   | A | .13 | .20/.25 | .17/.2 | .17/.20 | .13/.17 |

TABLE IV

| | | T1 VEL. IN/SEC | T2 3 days VEL. IN/SEC | T3 2½ months VEL. IN/SEC | T4 3½ months VEL. IN/SEC |
|---|---|---|---|---|---|
| | | | Example III | | |
| A | H | .09/.11 | .18/.30 | .35/.58 | .15/.23 |
|   | V | .09/.11 | .22/.40 | .25/.52 | .18/.23 |
|   | A | .13 | .12/.18 | .17/.32 | .15/.28 |
| B | H | .10/.12 | .20/.27 | .30/.45 | .15/.23 |
|   | V | .09/.13 | .17/.24 | .32/.42 | .17/.26 |
|   | A | .12 | .16/.22 | .20/.27 | .12/.23 |

That which is claimed is:

1. A bearing comprising:
   a first side in alignment with a radial axis and a second side opposite said first side;
   said first side including bumper means for withstanding thrust, extending outwardly therefrom comprising a substantially flat surface; and
   an inner-axial surface in alignment with an axial axis and an outer-axial surface opposite said inner-axial surface
   wherein said bearing comprises a thermoplastic, amideimide resinous material comprising at least one recurring unit of the following moieties:

TABLE I

| | | Control A | | | | | Example I | | |
|---|---|---|---|---|---|---|---|---|---|
| | | T1 VEL. IN/SEC | T2 8 days VEL. IN/SEC | T3 17 days VEL. IN/SEC | | | T1 VEL. IN/SEC | T2 1 day VEL. IN/SEC | VEL. IN/SEC |
| A | H | .20/.25 | .35/.65 | .20/.38 | A | H | .08/.09 | .10/.18 | .20/.30 |
|   | V | .15/.22 | .17/.25 | .12 |   | V | .06/.09 | .45/.20 | .08/.12 |
|   | A | .15/.20 | .22/.45 | .30/.45 |   | A | .08 | .15/.22 | .19 |
| B | H | .18/.25 | .3/.55 | .25/.50 | B | H | .06 | .10/.20 | .15/.25 |
|   | V | .20/.25 | .45/.85 | .40/.70 |   | V | .05 | .07/.11 | .15/.28 |
|   | A | .15/.20 | .2/.45 | .27/.36 |   | A | .06 | .13/.17 | .22/.28 |

TABLE II

| | | T1 VEL. IN/SEC | T2 4 days VEL. IN/SEC | T3 8 days VEL. IN/SEC | T4 12 days VEL. IN/SEC | | | T5 15 days VEL. IN/SEC | T6 20 days VEL. IN/SEC | T7 25 days VEL. IN/SEC |
|---|---|---|---|---|---|---|---|---|---|---|
| | | | | Example II | | | | | | |
| A | H | .12 | .15/.28 | .18/.28 | .18/.30 | A | H | .35/.45 | .24/.44 | .25/.55 |
|   | V | .13 | .25/.40 | .18/.34 | .22/.44 |   | V | .40/.60 | .30/.60 | .22/.38 |
|   | A | .08 | .12/.17 | .15/.25 | .18/.25 |   | A | .30/.40 | .30/.60 | .20/.40 |
| B | H | .12/.14 | .15/.25 | .10/.20 | .18/.28 | B | H | .20/.40 | .35 | .30/.55 |
|   | V | .10/.13 | .20/.30 | .15/.25 | .22/.40 |   | V | .20/.40 | .30/.40 | .22/.38 |
|   | A | .07/.10 | .13/.20 | .13/.20 | .14/.18 |   | A | .20/.30 | .20/.35 | .12/.25 |

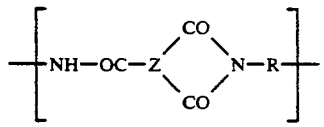

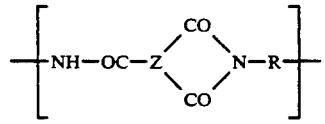

wherein one carbonyl group is meta to and one carbonyl group is para to each amide group and wherein Z is a trivalent benzene ring or lower alkyl-substituted trivalent benzene ring, R comprises one or more wholly- or largely-aromatic hydrocarbon radicals of from 6 to about 10 carbon atoms or two divalent aromatic hydrocarbon radicals of from 6 to about 10 atoms joined directly or by stable linkages selected from the group consisting of —O—, methylene, —CO—, SO$_2$—, and —S—.

2. The bearing of claim 1 wherein said bumper means comprises a substantially flat surface.

3. The bearing of claim 2 wherein said bumper means include inclined portions between portions of said flat surface and said first side.

4. The bearing of claim 1 wherein said bumper means includes at least two pads.

5. The bearing of claim 4 wherein said two pads are symmetrical.

6. The bearing of claim 1 wherein said bearing substantially floats in place.

7. The bearing of claim 1 wherein said bearing is substantially annular.

8. A bearing assembly comprising
   a) thrust bearings comprising an inboard bearing and an outboard bearing each comprising a first-active side in alignment with a radial axis and a second-inactive side opposite said first side, said first side including bumper means for withstanding thrust, extending outwardly therefrom comprising a substantially flat surface, and an inner-axial surface in alignment with an axial axis and an outer-axial surface opposite said inner-axial surface;
   b) means for aligning said thrust bearings in proximity to a rotating device wherein said bearing comprises a thermoplastic, amideimide resinous material comprising at least one recurring unit of the following moieties:

wherein one carbonyl group is meta to and one carbonyl group is para to each amide group and wherein Z is a trivalent benzene ring or lower alkyl-substituted trivalent benzene ring, R comprises one or more wholly- or largely-aromatic hydrocarbon radicals of from 6 to about 10 carbon atoms or two divalent aromatic hydrocarbon radicals of from 6 to about 10 atoms joined directly or by stable linkages selected from the group consisting of —O—, methylene, —CO—, SO$_2$—, and —S—.

9. The bearing assembly of claim 8 wherein said alignment means includes means for aligning said inboard bearing and means for aligning said outboard bearing with respect to a rotating device.

10. The bearing assembly of claim 9 further comprising securing means for securing said inboard bearing to said inboard thrust bearing alignment means.

11. The bearing assembly of claim 9 further comprising means for allowing said outboard bearing to float at least partially within said outboard bearing alignment means.

12. The bearing assembly of claim 9 further comprising means for biasing said outboard bearing in the inboard direction between said outboard bearing and said outboard bearing alignment means.

13. The bearing assembly of claim 8 further comprising a collar means for transferring thrust from a rotating device to said thrust bearings at least partially between said bumper means of said inboard and outboard bearings.

14. The bearing assembly of claim 8 further comprising a steady bearing bushing in proximity to said inboard bearing and surrounding a portion of said rotating device.

15. The bearing assembly by claim 14 wherein at least one of said steady bearings bushing comprises a poly(amide-imide).

16. The bearing assembly of claim 8 further comprising two substantially annular-steady bearing bushings surrounding a portion of said rotating device.

* * * * *